(12) United States Patent
Yamasaki et al.

(10) Patent No.: US 8,596,426 B2
(45) Date of Patent: Dec. 3, 2013

(54) ELECTRIC LINEAR MOTION ACTUATOR AND ELECTRIC BRAKE ASSEMBLY

(75) Inventors: Tatsuya Yamasaki, Iwata (JP); Masaaki Eguchi, Iwata (JP); Katsuhisa Yamaguchi, Iwata (JP); Tomoaki Makino, Iwata (JP)

(73) Assignee: NTN Corporation, Osaka (JP)

( * ) Notice: Subject to any disclaimer, the term of this patent is extended or adjusted under 35 U.S.C. 154(b) by 445 days.

(21) Appl. No.: 12/866,901

(22) PCT Filed: Feb. 17, 2009

(86) PCT No.: PCT/JP2009/052642
§ 371 (c)(1),
(2), (4) Date: Aug. 10, 2010

(87) PCT Pub. No.: WO2009/104578
PCT Pub. Date: Aug. 27, 2009

(65) Prior Publication Data
US 2010/0320043 A1    Dec. 23, 2010

(30) Foreign Application Priority Data

Feb. 20, 2008    (JP) ................................ 2008-038910

(51) Int. Cl.
*B60L 7/00*    (2006.01)
*F16H 48/06*   (2006.01)
(52) U.S. Cl.
USPC ......... 188/162; 188/156; 188/72.1; 188/72.2; 188/72.3; 188/72.4; 188/72.7; 188/72.8; 475/149
(58) Field of Classification Search
USPC ............. 188/156, 162, 72.1–72.4, 72.7–72.8; 74/89.34, 424.91, 424.92; 475/346, 475/347, 149, 150
See application file for complete search history.

(56) References Cited

U.S. PATENT DOCUMENTS 3,393,574 A    7/1968   Roantree
4,366,726 A *  1/1983   Nilsson .......................... 475/163
(Continued)

FOREIGN PATENT DOCUMENTS

JP    61-084455    4/1986
JP    62-147156    7/1987
(Continued)

OTHER PUBLICATIONS

International Search Report issued May 26, 2009 in International (PCT) Application No. PCT/JP2009/052642.

(Continued)

*Primary Examiner* — Robert A Siconolfi
*Assistant Examiner* — Mahbubur Rashid
(74) *Attorney, Agent, or Firm* — Wenderoth, Lind & Ponack, L.L.P.

(57) ABSTRACT

In an electric linear motion actuator, planetary rollers 7 rotatably supported on their radially inner surfaces by respective support pins 6b are radially inwardly biased by radially compressible ring springs 18 enveloping the support pins 6b, thereby biasing and pressing the respective planetary rollers 7 against the radially outer surface of a rotary shaft 4. Thus, it is possible to stably transmit torque of the rotary shaft 4 to the respective planetary rollers 7 without applying a preload to the planetary rollers 7 with a negative gap between the radially outer surface of the rotary shaft 4 and the radially inner surface of the outer ring member 5.

20 Claims, 10 Drawing Sheets

(56) References Cited

U.S. PATENT DOCUMENTS

| | | | |
|---|---|---|---|
| 4,428,437 A | | 1/1984 | Steinberg |
| 4,503,719 A | * | 3/1985 | Hamano ............... 74/7 E |
| 4,804,073 A | * | 2/1989 | Taig et al. ............ 188/72.1 |
| 4,850,457 A | * | 7/1989 | Taig ..................... 188/72.1 |
| 5,098,359 A | * | 3/1992 | Chales et al. ......... 475/347 |
| 6,098,288 A | * | 8/2000 | Miyagawa et al. ..... 30/43.91 |
| 6,554,109 B1 | | 4/2003 | Olschewski et al. |
| 8,109,370 B2 | * | 2/2012 | Yamasaki ............. 188/72.1 |
| 2007/0049453 A1 | * | 3/2007 | Nagai et al. .......... 475/254 |
| 2008/0159667 A1 | * | 7/2008 | Michioka et al. ....... 384/13 |
| 2009/0095579 A1 | | 4/2009 | Yamasaki |
| 2011/0247904 A1 | | 10/2011 | Yamasaki |

FOREIGN PATENT DOCUMENTS

| | | |
|---|---|---|
| JP | 6-327190 | 11/1994 |
| JP | 2002-115751 | 4/2002 |
| JP | 2002-276749 | 9/2002 |
| JP | 2003-343620 | 12/2003 |
| JP | 2005-331104 | 12/2005 |
| JP | 2007-032717 | 2/2007 |
| JP | 2007-037305 | 2/2007 |

OTHER PUBLICATIONS

A Notice of Reasons for Rejection, issued Mar. 19, 2013 in a counterpart foreign application (with partial English translation).

* cited by examiner

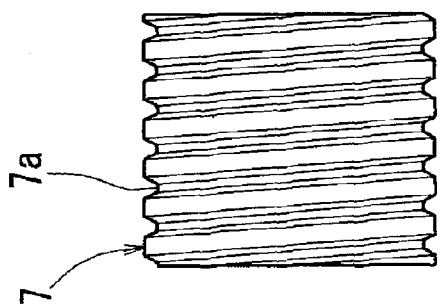
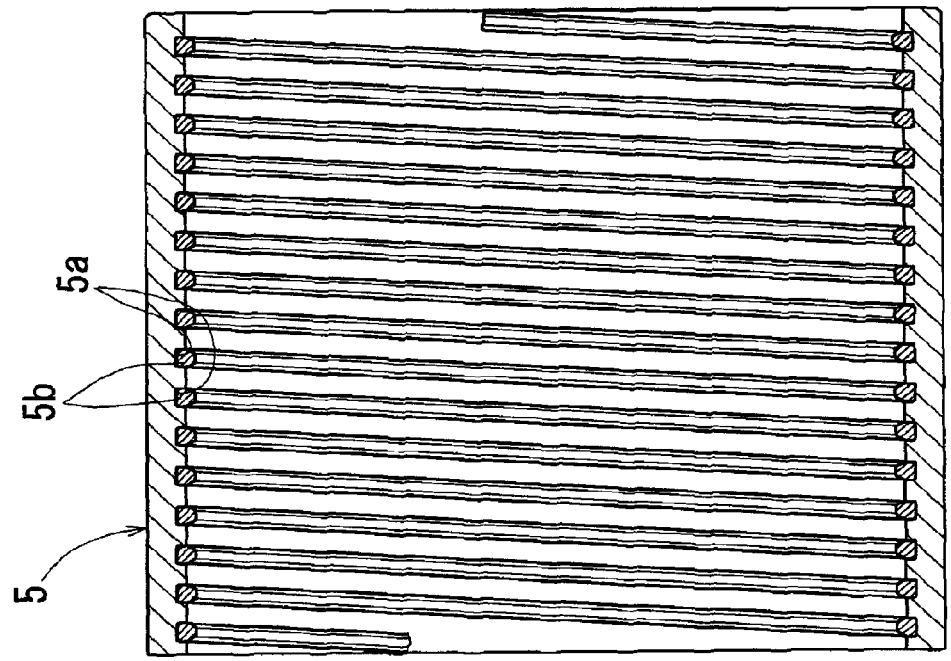

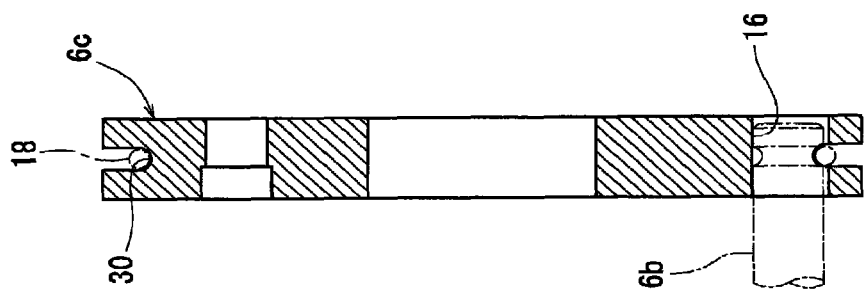
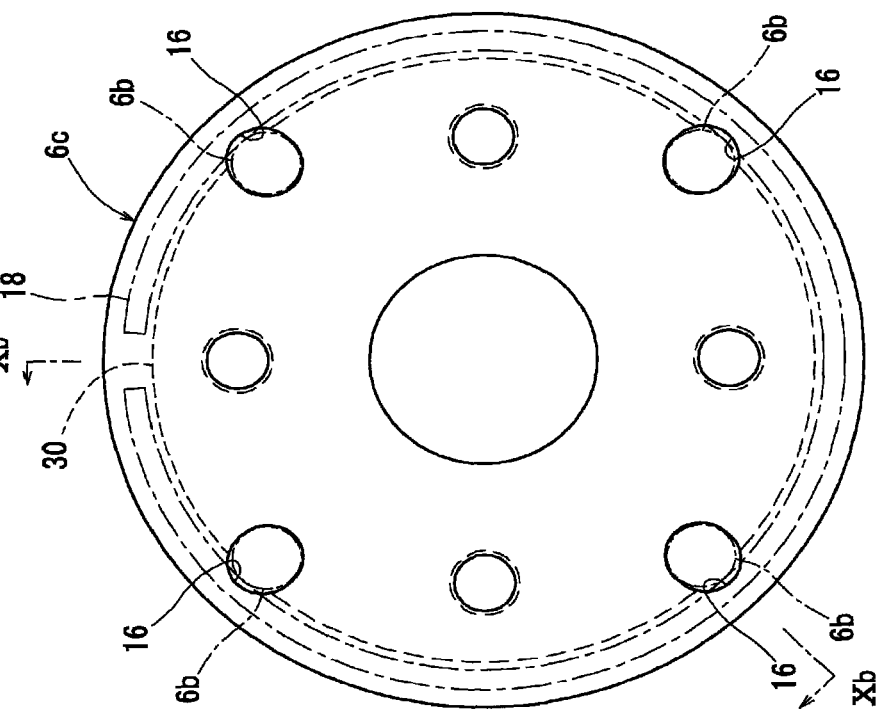

ELECTRIC LINEAR MOTION ACTUATOR AND ELECTRIC BRAKE ASSEMBLY

TECHNICAL FIELD

The present invention relates to an electric linear motion actuator for converting rotary motion of an electric motor to linear motion, thereby linearly driving a driven member, and an electric brake assembly for pressing a brake member against a member to be braked using the electric linear motion actuator.

BACKGROUND ART

Typically, electric linear motion actuators for converting rotary motion of an electric motor to linear motion, thereby linearly driving a driven member use a ball-screw mechanism or a ball-ramp mechanism. Also, in order to produce a large linear driving force with a small-capacity electric motor, a gear reduction mechanism such as a planetary gear reduction mechanism is often used (see e.g. JP Patent Publication 6-327190A).

While ball-screw mechanisms or ball-ramp mechanisms as used in electric linear motion actuators can amplify force to a certain extent with its motion converter mechanism due to threads having a lead angle or inclined cam surfaces. But these mechanisms cannot amplify force to such an extent as to be expected for e.g. electric brake assemblies. Thus, electric linear motion actuators including such a motion converter mechanism further include a separate speed reduction mechanism such as a planetary gear reduction mechanism to amplify driving force. By mounting such a separate speed reduction mechanism, it becomes difficult compactly design the electric linear motion actuator.

In order to avoid this problem, the present inventors proposed an electric linear motion actuator which can sufficiently amplify force without the need for a separate speed reduction mechanism and which is suitable for use in an electric brake assembly, of which the linear motion stroke is short. This linear motion actuator comprises a rotary shaft to which rotation of a rotor shaft of an electric motor is configured to be transmitted, a casing, an outer ring member fixed to a radially inner surface of the casing, a carrier, and a plurality of planetary rollers rotatably supported by the carrier and disposed radially outwardly of the rotary member between the outer ring member and the rotary member such that the respective planetary rollers revolve around the rotary shaft while rotating about their respective axes as the rotary shaft rotates, wherein a helical rib is provided on a radially outer surface of the rotary shaft or a radially inner surface of the outer ring member, and wherein each of the planetary rollers has on its radially outer surface circumferential grooves which are identical in pitch to the helical rib and in which the helical rib is engaged, or a helical groove which is identical in pitch to and differs in lead angle from the helical rib and in which the helical rib is engaged, whereby the carrier is axially moved relative to the rotary shaft as the rotary shaft rotates and the planetary rollers revolve around the rotary shaft while rotating about their respective axes, thereby converting rotary motion of the rotary shaft to linear motion of the carrier (see JP Patent Publication 2007-32717A and JP Patent Publication 2007-37305A).

On the other hand, while conventional vehicle brake assemblies are mostly hydraulic ones, with the introduction of sophisticated brake control such as ABS (anti-lock brake system), electric brake assemblies are gathering attention, because electric brake assemblies can perform such sophisticated brake control without the need for complicated hydraulic circuits. Electric brake assemblies actuate an electric motor based on e.g. signals indicative of depression of the brake pedal, thereby pressing the brake member against the member to be braked through the above-described electric linear motion actuator, which is mounted in the caliper body (see JP Patent Publication 2003-343620A). Since such an electric brake assembly is mounted under a vehicle spring, it is desired that such a brake assembly be compact in size and operate stably under vibrations transmitted from the road surface.

The electric linear motion actuators disclosed in JP Patent Publication 2007-32717A and JP Patent Publication 2007-37305A are compact in size because no separate speed reduction mechanism is mounted and still can produce large force. But because a preload is applied to the planetary rollers by fitting the planetary rollers between the radially outer surface of the rotary shaft and the radially inner surface of the outer ring member with a negative gap, it is necessary to mount the planetary rollers between the outer ring member and the rotary shaft by e.g. shrink fitting. Also, in order to control the negative gap for the preload, it is necessary to finish the radially outer surface of the rotary shaft and the radially inner surface of the outer ring member to high dimensional accuracy by e.g. grinding. Thus, additional time is necessary for the steps of finishing the rotary shaft and the outer ring member and of mounting the planetary rollers, which pushes up the manufacturing cost.

SUMMARY OF THE INVENTION

An object of the present invention is to make it possible to stably transmit torque of the rotary shaft to the respective planetary rollers without applying a preload to the planetary rollers with a negative gap between the radially outer surface of the rotary shaft and the radially inner surface of the outer ring member.

In order to achieve this object, the present invention provides an electric linear motion actuator comprising a rotary shaft to which rotation of a rotor shaft of an electric motor is configured to be transmitted, a casing, an outer ring member fixed to a radially inner surface of the casing, a carrier, and a plurality or planetary rollers rotatably supported by the carrier and disposed radially outwardly of the rotary member between the outer ring member and the rotary member such that the respective planetary rollers revolve around the rotary shaft while rotating about their respective axes as the rotary shaft rotates, wherein a helical rib is provided on a radially outer surface of the rotary shaft or a radially inner surface of the outer ring member, and wherein each of the planetary rollers has on its radially outer surface circumferential grooves which are identical in pitch to the helical rib and in which the helical rib is engaged, or a helical groove which is identical in pitch to and differs in lead angle from the helical rib and in which the helical rib is engaged, whereby the carrier is axially moved relative to the rotary shaft as the rotary shaft rotates and the planetary rollers revolve around the rotary shaft while rotating about their respective axes, thereby converting rotary motion of the rotary shaft to linear motion of the carrier so as to linearly drive a driven member, wherein the actuator further comprises elastic members for biasing and pressing the respective planetary rollers against the radially outer surface of the rotary shaft.

By providing elastic members for biasing and pressing the planetary rollers against the radially outer surface of the rotary shaft, it is possible to stably transmit torque of the rotary shaft to the respective planetary rollers without applying a preload to the planetary rollers with a negative gap between the radially outer surface of the rotary shaft and the radially inner surface of the outer ring member.

Means for biasing and pressing the respective planetary rollers may comprise pins rotatably supporting radially inner surfaces of the respective planetary rollers and mounted to the carrier so as to be radially movable but circumferentially immovable, and radially inwardly biased toward the rotary shaft by the elastic members.

Bearing members may be fitted in the radially inner surfaces of the respective planetary rollers to reduce friction loss as the planetary rollers rotate.

Means for biasing and pressing the respective planetary rollers may comprise pins rotatably supporting radially outer surfaces of the respective planetary rollers and mounted to the carrier so as to be radially movable but circumferentially immovable, and radially inwardly biased toward the rotary shaft by the elastic members.

Bearing members may be fitted around the respective support pins so as to be rotatable in abutment with the radially outer surfaces of the respective planetary rollers to reduce friction loss as the planetary rollers rotate.

The bearings may be slide bearings that rotate while sliding around the respective support pins to reduce the size of the bearing members.

The slide bearings are preferably made of a resin or an oil-containing material.

By radially inwardly biasing both end portions of the support pins with the elastic members, it is possible to axially uniformly press the respective planetary rollers against the radially outer surface of the rotary shaft, and thus to more stably transmit torque of the rotary shaft to the respective planetary rollers.

The elastic members for radially inwardly biasing the support pins may be ring-shaped elastic members enveloping the respective support pins and configured to be elastically deformed so as to be radially compressed.

To prevent separation of the ring-shaped elastic members which envelop the respective pins, the support pins may be formed with grooves, respectively, in which the respective ring-shaped elastic members are engaged.

The ring-shaped elastic members configured to be elastically deformed so as to be radially compressed may be radially compressible ring springs made of spring steel and having circumferentially separate ends.

The elastic members radially inwardly biasing the support pins may comprise columnar elastic members retained by the carrier and individually radially inwardly biasing the respective support pins.

The support pins may be formed with grooves, respectively, in which the respective columnar elastic members or intermediate members through which the biasing force of the elastic members is transmitted to the support pins are engaged to prevent separation of the respective support pins axially from the carrier.

The columnar elastic members may be compression coil springs.

The electric brake assembly according to the present invention comprises an electric linear motion actuator for converting rotary motion of an electric motor to linear motion, thereby linearly driving a brake member to press the linearly driven brake member against a member to be braked, wherein the electric linear motion actuator is the one of the above-described actuators.

Since the electric linear motion actuator according to the present invention includes elastic members biasing and pressing the respective planetary rollers against the radially outer surface of the rotary shaft, it is possible to stably transmit torque of the rotary shaft to the respective planetary rollers without applying a preload to the planetary rollers with a negative gap between the radially outer surface of the rotary shaft and the radially inner surface of the outer ring member.

BRIEF DESCRIPTION OF THE DRAWINGS

FIGS. 5(a) and (b) are front views showing the helical ribs of the outer ring member and the helical groove of each planetary roller, of FIG. 1, respectively.

FIG. 10(a) is a front view of a support plate of FIG. 8; and FIG. 10(b) is a sectional view taken along line Xb-Xb of FIG. 10(a).

DETAILED DESCRIPTION OF THE INVENTION

Figure 1:
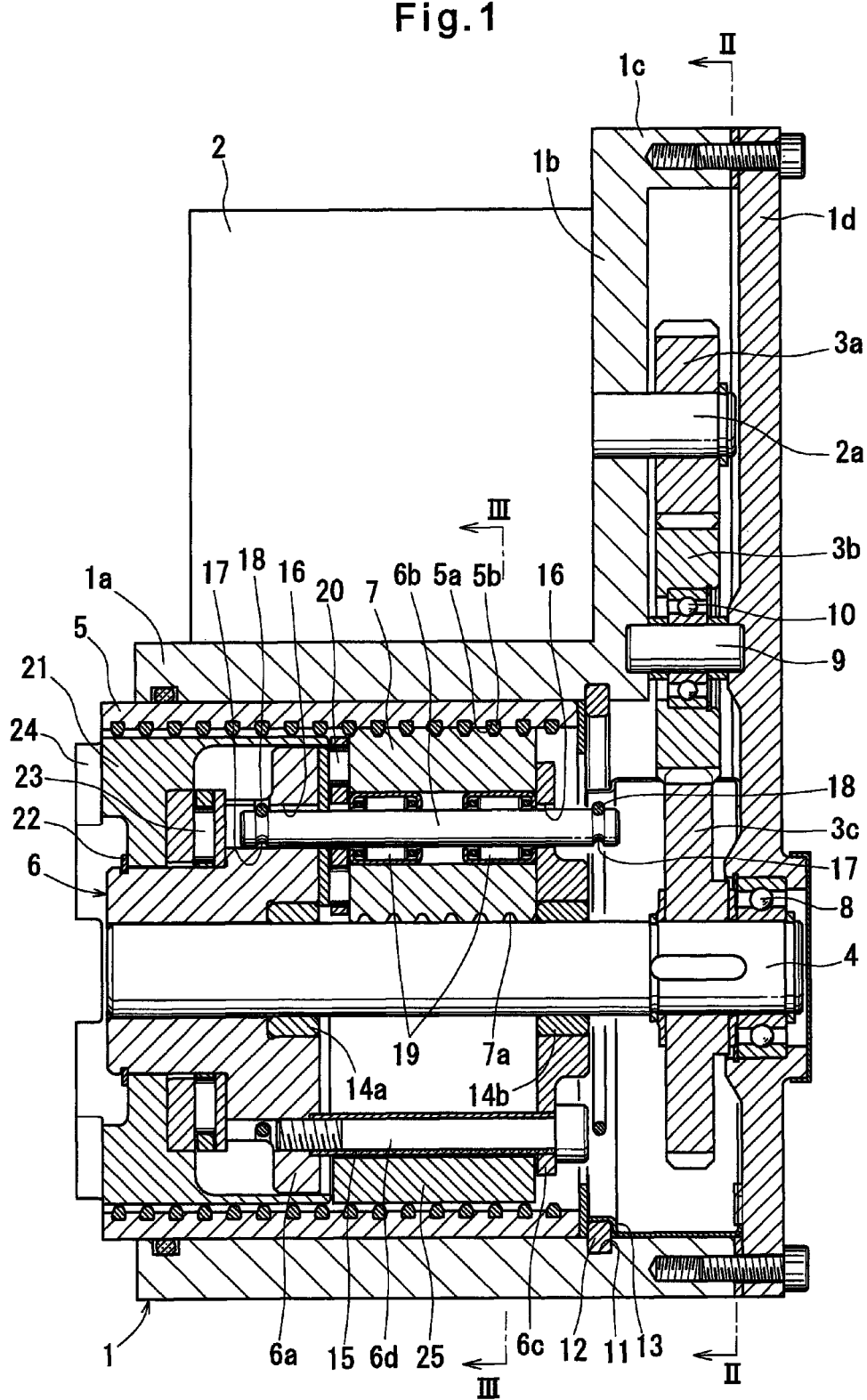
FIG. 1 is a vertical sectional view of an electric linear motion actuator according to a first embodiment.
Figure 2:
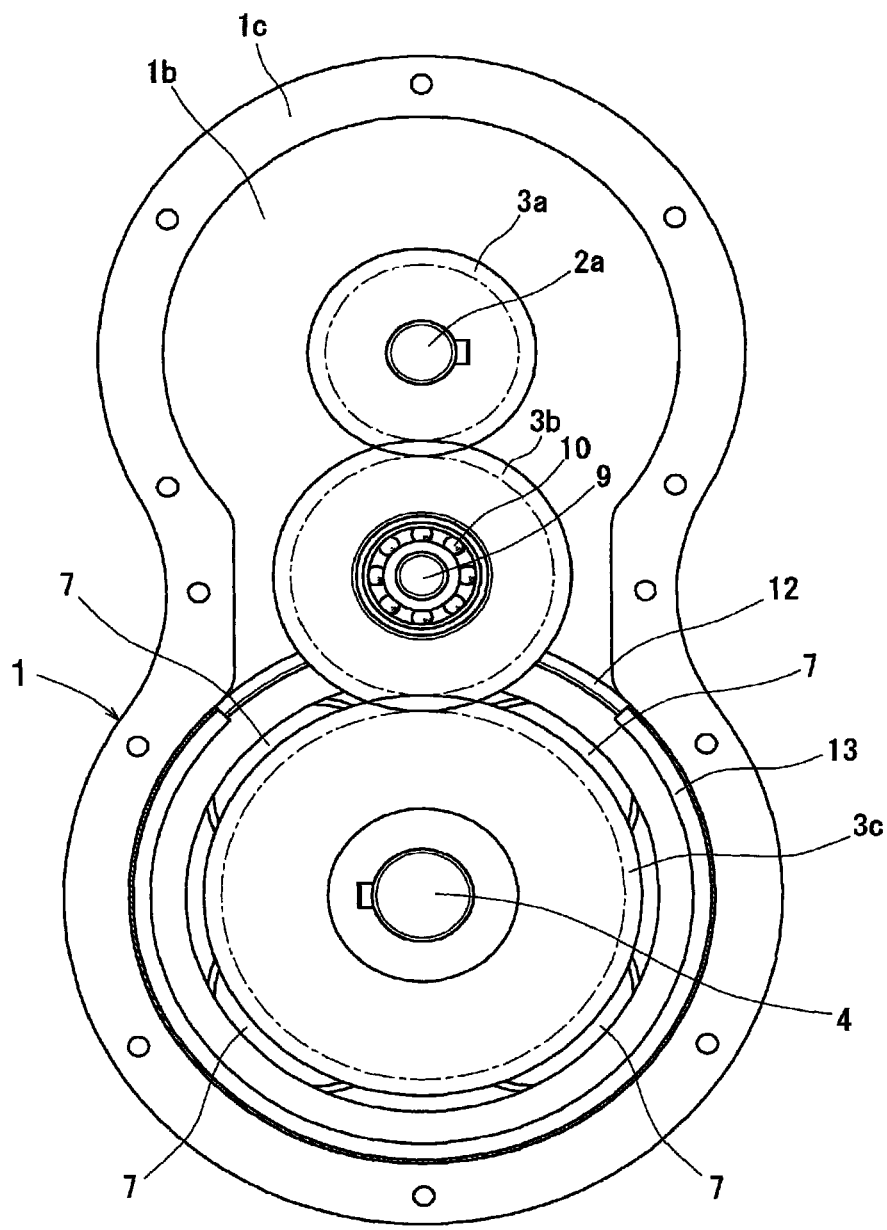
FIG. 2 is a sectional view taken along line II-II of FIG. 1.
Figure 3:
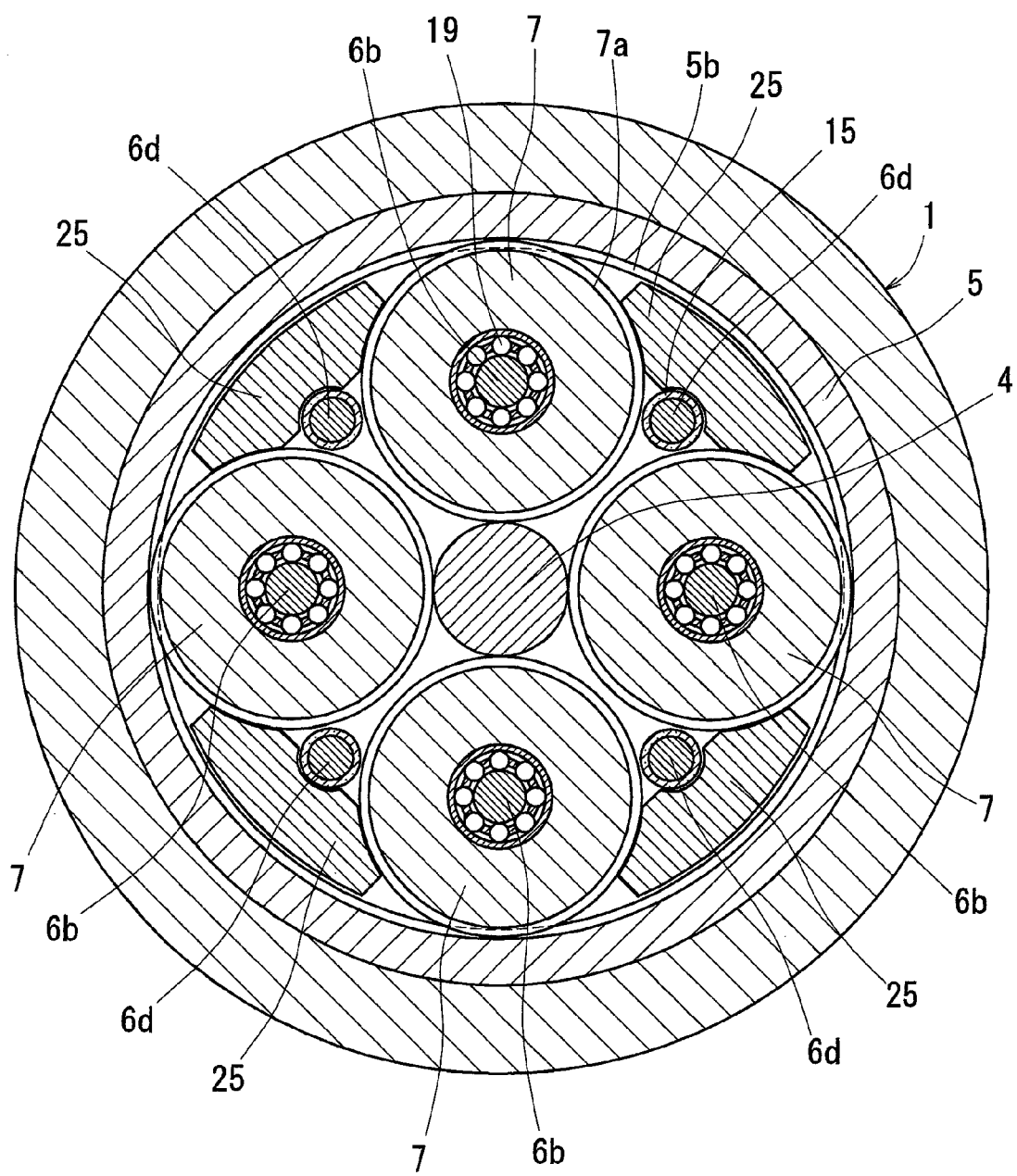
FIG. 3 is a sectional view taken along line III-III of FIG. 1.

Now the embodiments of the present invention are described with reference to the drawings. FIGS. 1 to 6 show the first embodiment. As shown in FIGS. 1 to 3, the electric linear motion actuator of this embodiment includes a casing 1 comprising a cylindrical portion 1a and an hourglass-shaped flange 1b protruding from one end of the cylindrical portion 1a. An electric motor 2 is mounted to the flange 1b in parallel to the cylindrical portion 1a. The electric motor 2 has a rotor shaft 2a which is configured such that its rotation is transmitted to a rotary shaft 4 extending along the axis of the cylindrical portion 1a through gears 3a, 3b and 3c. Four planetary rollers 7 rotatably supported by a carrier 6 are disposed between the rotary shaft 4 and an outer ring member 5 fixed to the radially inner surface of the cylindrical portion 1a. When the rotary shaft 4 rotates, the respective planetary rollers 7 are configured to revolve around the rotary shaft 4, while rotating about their own axes.

On the side of the flange 1b, the casing 1 has a peripheral wall 1c extending from the outer periphery of both the cylindrical portion 1a and the flange 1b. A lid 1d is mounted to the peripheral wall 1c. The gears 3a, 3b and 3c are arranged so as to mesh with each other on a single axial plane in the space defined by the peripheral wall 1c and the lid 1d. The rotary shaft 4, which carries the gear 3c, is supported in a hole formed in the lid 1d through a ball bearing 8. The intermediate gear 3b, which meshes with the gear 3a, which is mounted on the rotor shaft 2a and the gear 3c, is supported on a shaft pin 9 extending between the flange 1b and the lid 1d through a ball bearing 10.

An annular groove 11 is formed in the radially inner surface of the cylindrical portion 1a of the casing 1. A stopper 12 is fitted in the annular groove 11 for receiving axial reaction force of the linear motion actuator applied to the outer ring member 5. An annular retaining member 13 is fitted in the radially inner surface of the cylindrical portion 1a to retain the radially inner surface of the stopper 12. The stopper 12 comprises a plurality of circumferentially separated segments so that it can be easily fitted in the annular groove 11. The retaining member 13 has a circumferential cutout so as not to interfere with the intermediate gear 3b.

The carrier 6 comprises a carrier body 6a supported by the rotary shaft 4 through a slide bearing 14a, support pins 6b supporting the radially inner surfaces of the respective planetary rollers 7, a support plate 6c supported on the rotary shaft 4 through a slide bearing 14b, and a plurality of coupling bolts 6d extending between the respective adjacent planetary rollers 7 and coupling the support plate 6c to the carrier body 6a. A collar 15 is fitted on the radially outer surface of each coupling bolt 6d for angularly aligning the support plate 6c with the carrier body 6a. Each support pin 6b has its proximal and distal end portions engaged in radially elongated holes 16 formed in the carrier body 6a and the support plate 6c, respectively, so as to be radially movable but circumferentially immovable.

Figure 4:
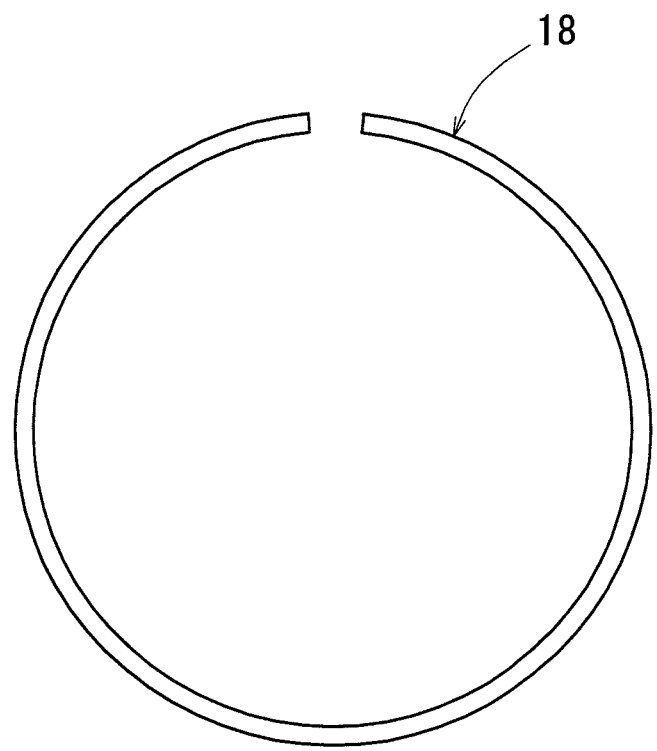
FIG. 4 is a side view of a radially compressible ring spring of FIG. 1.

Grooves 17 are formed in the radially outer surfaces of the respective support pins 6b at their proximal and distal end portions. Radially compressible ring springs 18 made of spring steel and having circumferentially separate ends as shown in FIG. 4 are engaged in the grooves 17 at the proximal and distal ends, respectively, so as to envelop the support pins 6b. The ring springs 18 bias and press the planetary rollers 7, which are rotatably supported on the respective support pins 6b, against the radially outer surface of the rotary shaft 4, so that the torque of the rotary shaft 4 is stably transmitted to the respective planetary rollers 7. The radially compressible ring springs 18 may be replaced by radially compressible ring-shaped compression springs.

Each planetary roller 7 is rotatably supported on the support pin 6b through needle roller bearings 19, and is supported on the carrier body 6a through a thrust roller bearing 20 so as to be rotatable about the pin 6b relative to carrier body 6a. A linearly driven member 21 is coupled to the carrier 6, which revolves around the rotary shaft 4 together with the planetary rollers 7 so that the linear motions of the planetary rollers 6 are transmitted to the linearly driven member 21 through the carrier 6. The linearly driven member 21 is fitted on the cylindrical portion of the carrier body 6a so as to be rotatable relative to the carrier body 6a through a thrust roller bearing 23. A snap ring 22 prevents separation of the linearly driven member 21 from the carrier body 6a. The linearly driven member 21 has keys 24 on its outer end surface through which the linearly driven member 21 can be nonrotatably coupled to a member to be driven.

Between each adjacent pair of planetary rollers 7, a fan-shaped lubricant application member 25 is held between the coupling bolt 6d of the carrier 6 and the radially inner surface of the outer ring member 5 which are in sliding contact with the radially outer surfaces of the planetary rollers 7 on both sides for applying grease thereto.

As shown in FIG. 5(*a*), two helical grooves 5a are formed in the radially inner surface of the outer ring member 5, with which the planetary rollers are in rolling contact. Two rib members 5b are engaged in and fixed to the respective helical grooves 5a to form two helical ribs on the radially inner surface of the outer ring member 5. As shown in FIG. 5(*b*), a single helical groove 7a which is identical in pitch to and differs in lead angle from the helical ribs formed by the rib members 5b is formed in the radially outer surface of each planetary roller 7 in which the helical ribs are engaged. Two helical ribs are formed on the outer ring member 5 so that the difference in lead angle between the helical ribs and the helical grooves 7a of the planetary rollers 7 can be determined more freely. But instead, only one helical rib may be provided on the outer ring member. Also, instead of the helical groove 7a, circumferential grooves having no lead angle may be formed on the planetary rollers 7.

The helical groove 7a formed on the radially outer surface of each planetary roller 7 has both side walls inclined such that the width of the groove 7a gradually increases from its bottom toward its side edges. The helical ribs on the radially inner surface of the outer ring member 5, which are formed by the rib members 5b, have their both side walls inclined at the same inclination angle as the side walls of the helical grooves 7a such that the width of these ribs decreases from their bases toward their apexes. Thus, when the helical ribs of the outer ring member 5 are engaged in the helical grooves 7a of the respective planetary rollers 7, with the planetary rollers 7 in rolling contact with the radially inner surface of the outer ring member 5, the shoulders of the helical ribs never contact the side edges of the helical grooves 7a. Also, when the helical ribs are engaged in the helical grooves 7a, their side walls are uniformly brought into abutment with the inclined side walls of the helical grooves 7a. Thus, the helical ribs are smoothly engaged in the helical grooves 7a.

Figure 6:
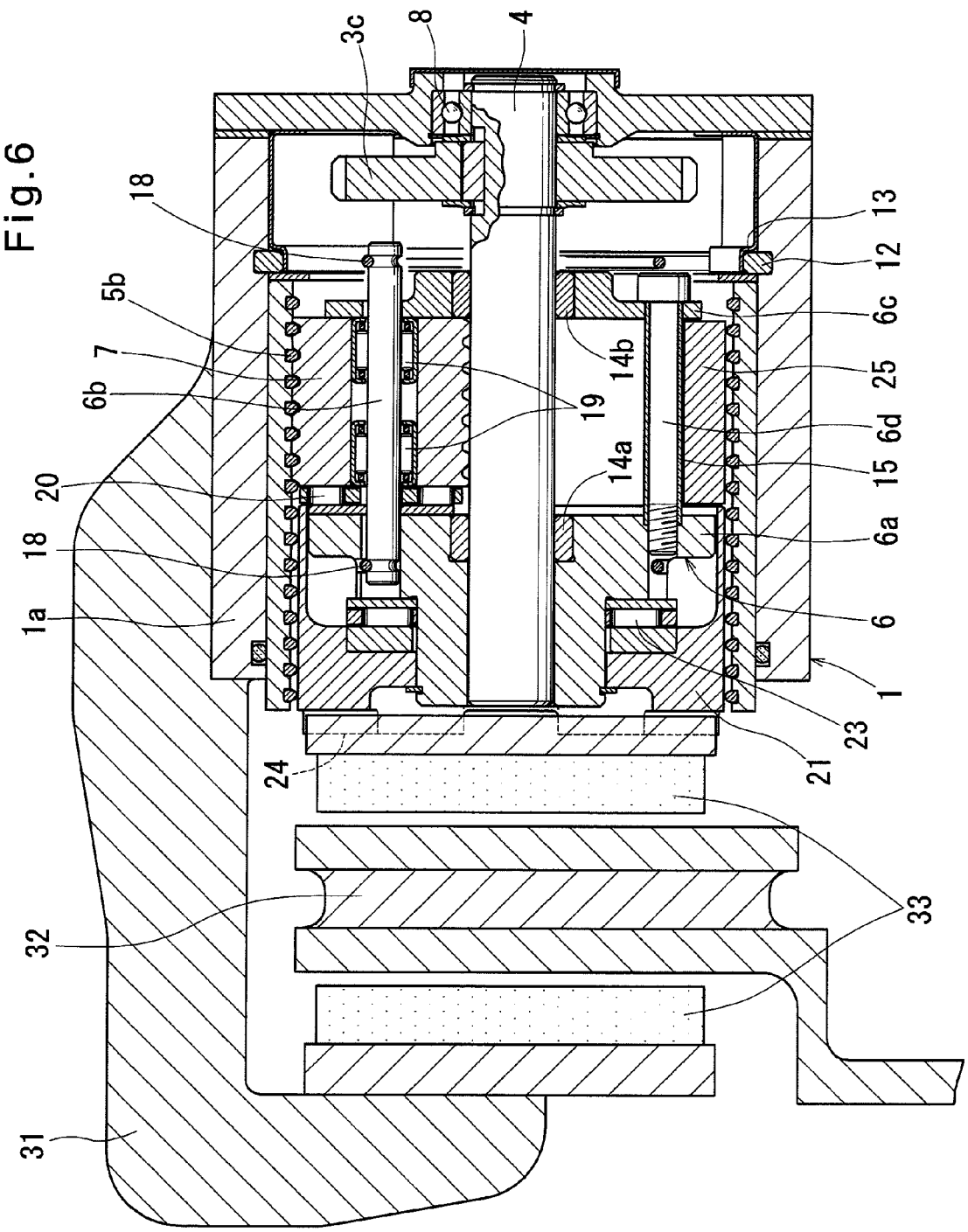
FIG. 6 is a vertical sectional view of an electric brake assembly including the electric linear motion actuator of FIG. 1.

FIG. 6 shows an electric brake assembly including the above-described electric linear motion actuator. This electric brake assembly is a disc brake including a disc rotor 32 as a braked member mounted in a caliper body 31, and brake pads 33 as braking members provided on both sides of the disc rotor 32 so as to face the disc rotor. The casing 1 of the electric linear motion actuator is fixed to the caliper body 31, with the linearly driven member 21 rotationally fixed to one of the brake pads 33 through the keys 24 to press the brake pads 33 against the disc rotor 32. FIG. 6 shows a sectional view of the electric linear actuator taken along a plane perpendicular to the plane shown in FIG. 1.

Figure 7:
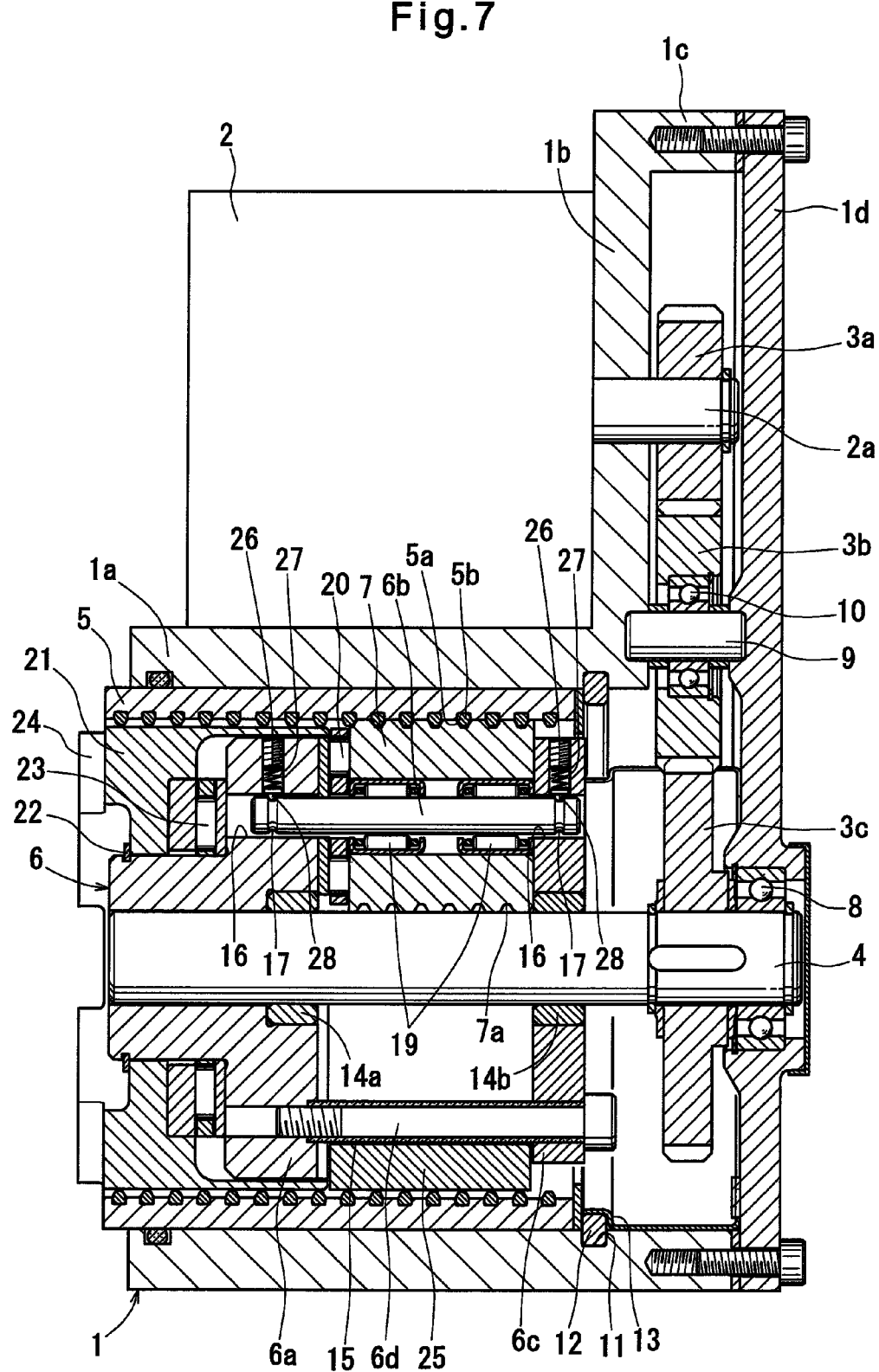
FIG. 7 is a vertical sectional view of an electric linear motion actuator according to a second embodiment.

FIG. 7 shows a second embodiment. The electric linear motion actuator of this embodiment is basically of the same structure as that of the first embodiment, and differs therefrom in that the respective support pins 6b, which rotatably support the radially inner surfaces of the respective planetary rollers 7, have their proximal and distal ends individually biased radially inwardly by compression springs 27 received in radial holes 26 formed in the carrier body 6a and the support plate 6c through intermediate members 28, respectively, so that the planetary rollers 7 are pressed against the radially outer surface of the rotary shaft 4. Otherwise, this embodiment is identical to the first embodiment. Grooves 17 are formed in the radially outer surfaces of the respective support pins 6b at both ends in which the intermediate members 28 are engaged. The support pins 6b have their proximal and distal end portions received in radially elongated holes 16 formed in the carrier body 6a and the support plate 6c so as to be radially movable but circumferentially immovable.

Figure 8:
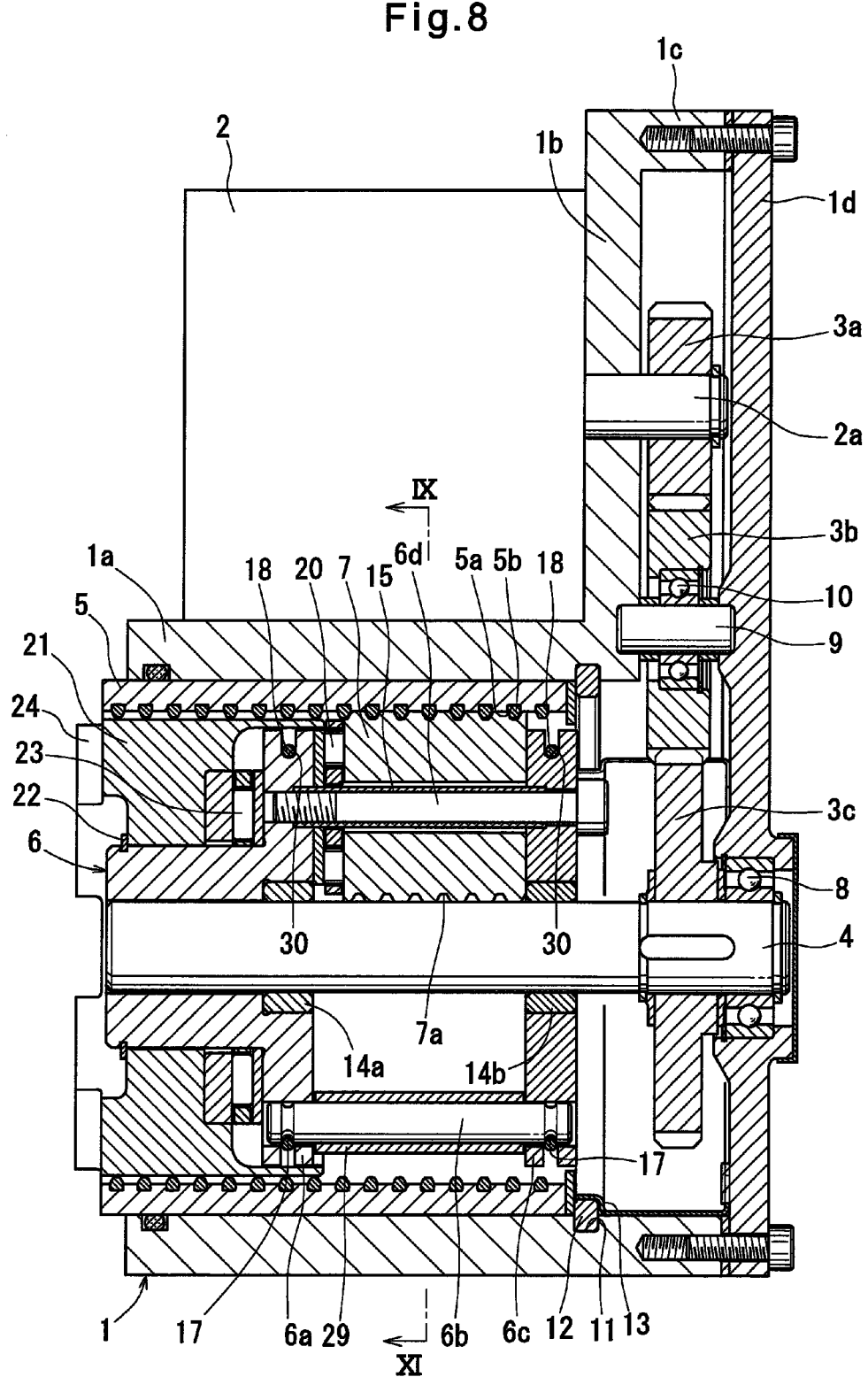
FIG. 8 is a vertical sectional view of an electric linear motion actuator according to a third embodiment.
Figure 9:
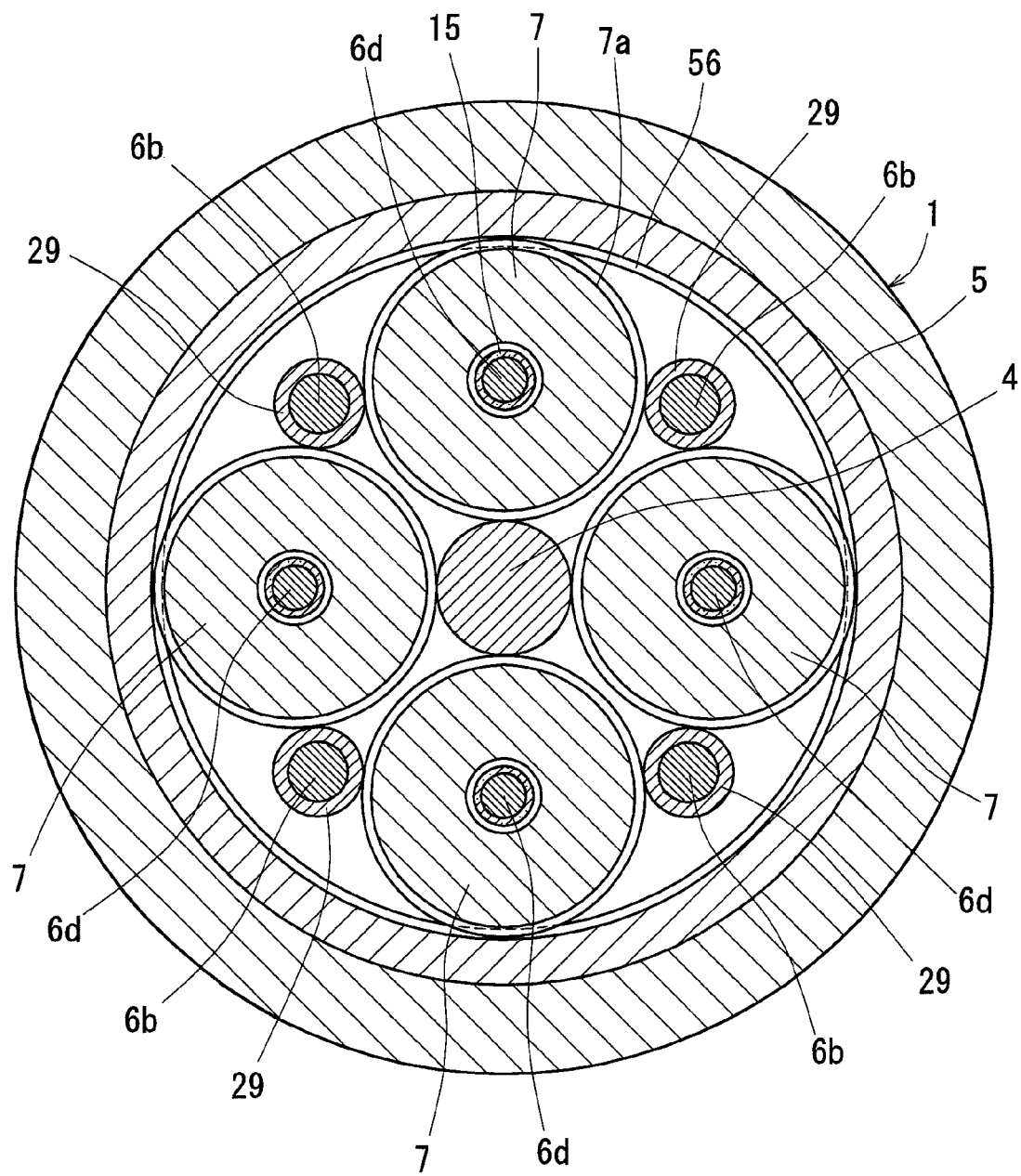
FIG. 9 is a sectional view taken along line IX-IX of FIG. 8.

FIGS. 8 to 10 show the third embodiment. As shown in FIGS. 8 and 9, the radially outer surfaces of the planetary rollers 7 are rotatably supported by support pins 6b of the carrier 6, and the carrier body 6a and the support plate 6c are coupled together by means of coupling bolts 6d extending through central holes of the respective planetary rollers 7. Otherwise, this embodiment is the same as the first embodiment, except that the lubricant application members 25 are omitted.

A slide bearing 29 made of resin is mounted around each support pin 6b which is adapted to rotate in abutment with the radially outer surfaces of the planetary rollers 7. A collar 15 is fitted on the radially outer surface of each coupling bolt 6d for angularly aligning the support plate 6c with the carrier body 6a. With the collar 15 mounted, each coupling bolt 6d extends through the central hole of the planetary roller 7 with a gap left therebetween.

As in the first embodiment, each support pin 6b has its proximal and distal end portions engaged in radially elongated holes 16 formed in the carrier body 6a and the support plate 6c, respectively, so as to be radially movable but circumferentially immovable. Grooves 17 are formed in the radially outer surfaces of the respective support pins 6b at both ends thereof. Radially compressible ring springs 18 are engaged in the respective grooves 17 so as to envelop the support pins 6b. The ring springs 18 thus radially inwardly bias the support pins 6b, thereby biasing and pressing the planetary rollers 7 against the radially outer surface of the rotary shaft 4.

As shown in FIGS. 10(a) and 10(b), an annular groove 30 is formed in the radially outer surface of the support plate 6c of the carrier 6 in which one of the radially compressible ring springs 18 is engaged. The annular groove 30 extends radially inwardly beyond the radially outer ends of the radially elongated holes 16, in which the respective support pins 6b are engaged, so that the radially compressible ring spring 18 fitted in the annular groove 30 envelop the support pins 6b, which are engaged in the respective elongated holes 16. While not shown, a similar annular groove 30 is also formed in the radially outer surface of the carrier body 6a in which the other radially compressible ring spring 18 is engaged.

In the above embodiments, helical ribs which engage in the helical grooves or circumferential grooves formed on the radially outer surfaces of the planetary rollers are formed on the radially inner surface of the outer ring member, and the helical ribs are formed by separate rib members. But instead, such helical ribs or rib may be formed on the radially outer surface of the rotary shaft. Also, such helical ribs or rib may be integrally formed on the outer ring member or the rotary shaft.

What is claimed is:

1. An electric linear motion actuator comprising:
   a rotary shaft to which rotation of a rotor shaft of an electric motor is configured to be transmitted;
   a casing;
   an outer ring member fixed to a radially inner surface of the casing;
   a carrier; and
   a plurality of planetary rollers rotatably supported by the carrier for rotation about respective axes and disposed radially outwardly of the rotary shaft between the outer ring member and the rotary shaft such that the planetary rollers revolve around the rotary shaft while rotating about the respective axes as the rotary shaft rotates;
   wherein a helical rib is provided on a radially outer surface of the rotary shaft or a radially inner surface of the outer ring member;
   wherein each of the planetary rollers has on its radially outer surface circumferential grooves which are identical in pitch to the helical rib and in which the helical rib is engaged, or a helical groove which is identical in pitch to and differs in lead angle from the helical rib and in which the helical rib is engaged, whereby the carrier is axially moved relative to the rotary shaft as the rotary shaft rotates and the planetary rollers revolve around the rotary shaft while rotating about their respective axes, thereby converting rotary motion of the rotary shaft to linear motion of the carrier so as to linearly drive a driven member; and
   wherein elastic members are arranged for biasing and pressing the respective planetary rollers against the radially outer surface of the rotary shaft.

2. The electric linear motion actuator of claim 1 further comprising support pins mounted to the carrier so as to be radially movable but circumferentially immovable relative to the carrier;
   wherein said support pins rotatably support radially inner surfaces of the respective planetary rollers; and
   wherein said elastic members are operably coupled to said support pins such that the support pins, and the planetary rollers supported by the support pins, are radially inwardly biased toward the rotary shaft by said elastic members.

3. The electric linear motion actuator of claim 2 further comprising bearing members fitted in the radially inner surfaces of the planetary rollers, respectively, to rotatably support the planetary rollers on the support pins, respectively.

4. The electric linear motion actuator of claim 2 wherein said elastic members radially inwardly bias both end portions of the support pins.

5. The electric linear motion actuator of claim 2 wherein the elastic members for radially inwardly biasing the support pins are ring-shaped elastic members enveloping the support pins and configured to be elastically deformed so as to be radially compressed.

6. The electric linear motion actuator of claim 5 wherein said support pins are formed with grooves, respectively, in which the respective ring-shaped elastic members which envelop the support pins are engaged.

7. The elastic linear motion actuator of claim 5 wherein the ring-shaped elastic members configured to be elastically deformed so as to be radially compressed are radially compressible ring springs made of spring steel and having circumferentially separate ends.

8. The elastic linear motion actuator of claim 6 wherein the ring-shaped elastic members configured to be elastically deformed so as to be radially compressed are radially compressible ring springs made of spring steel and having circumferentially separate ends.

9. The electric linear motion actuator of claim 2 wherein the elastic members radially inwardly biasing the support pins comprise columnar elastic members retained by the carrier and individually radially inwardly biasing the support pins, respectively.

10. The electric linear motion actuator of claim 9 wherein said support pins are formed with grooves, respectively, in which the columnar elastic members or intermediate members through which the biasing force of the elastic members is transmitted to the support pins are engaged.

11. The electric linear motion actuator of claim 9 wherein said columnar elastic members are compression coil springs.

12. The electric linear motion actuator of claim 1 further comprising support pins mounted to the carrier so as to be radially movable but circumferentially immovable relative to the carrier;
   wherein said support pins rotatably support radially outer surfaces of the planetary rollers; and
   wherein said elastic members are operably coupled to said support pins such that the support pins, and the planetary rollers supported by the support pins are radially inwardly biased toward the rotary shaft by said elastic members.

13. The electric linear motion actuator of claim 12 wherein bearing members are fitted around the support pins, respectively, so as to be rotatable in abutment with the radially outer surfaces of the planetary rollers.

14. The electric linear motion actuator of claim 13 wherein said bearings are slide bearings that rotate while sliding around the support pins, respectively.

15. An electric brake assembly comprising the electric linear motion actuator according to claim 1 for converting rotary motion of an electric motor to linear motion, thereby linearly driving a brake member to press the linearly driven brake member against a member to be braked.

16. The electric linear motion actuator of claim 1 further comprising support pins mounted to the carrier so as to be radially movable but circumferentially immovable relative to the carrier;
   wherein said support pins are rotatably engaged with the planetary rollers; and
   wherein said elastic members are operably coupled to said support pins such that the support pins, and the planetary rollers supported by the support pins, are radially inwardly biased toward the rotary shaft by said elastic members.

17. The electric linear motion actuator of claim 16, wherein said carrier has radially elongated holes formed therein; and
   said support pins are mounted to the carrier so as to be radially movable but circumferentially immovable relative to the carrier by being disposed in said radially elongated holes.

18. The electric linear motion actuator of claim 17, wherein the support pins extend through said planetary rollers, respectively, so as to rotatably support said planetary rollers.

19. The electric linear motion actuator of claim 16, wherein said carrier includes a carrier body disposed in said casing and a support plate disposed in said casing axially separated from said carrier body;
   said carrier body has radially elongated holes formed therein;
   said carrier support plate has radially elongated holes formed therein; and
   said support pins each have first and second axial ends and are mounted to the carrier so as to be radially movable but circumferentially immovable relative to the carrier by having the first axial ends disposed in said radially elongated holes of the carrier body, and the second axial ends disposed in the radially elongated holes of the support plate.

20. The electric linear motion actuator of claim 19, wherein the support pins extend through said planetary rollers, respectively, so as to rotatably support said planetary rollers.

* * * * *